US012529475B2

(12) United States Patent
Berg et al.

(10) Patent No.: US 12,529,475 B2
(45) Date of Patent: Jan. 20, 2026

(54) AERIAL BASKET TOOL APRON WITH INTEGRATED POWER SYSTEM

(71) Applicant: Emerson Professional Tools, LLC, Elyria, OH (US)

(72) Inventors: Ryan A. Berg, Roscoe, IL (US); John Russell Fenske, Loves Park, IL (US); Donald Dohr, Rockford, IL (US)

(73) Assignee: Emerson Professional Tools, LLC, Elyria, OH (US)

(*) Notice: Subject to any disclaimer, the term of this patent is extended or adjusted under 35 U.S.C. 154(b) by 115 days.

(21) Appl. No.: 18/652,051

(22) Filed: May 1, 2024

(65) Prior Publication Data

US 2025/0341306 A1 Nov. 6, 2025

(51) Int. Cl.

*F21V 33/00* (2006.01)
*B25H 1/12* (2006.01)
(Continued)

(52) U.S. Cl.

CPC ........... *F21V 33/0084* (2013.01); *B25H 1/12* (2013.01); *B25H 5/00* (2013.01); *B60R 11/06* (2013.01); *B66F 17/006* (2013.01); *G08B 21/02* (2013.01)

(58) Field of Classification Search

CPC .. B25H 1/12; B25H 5/00; B60R 11/06; B66F 17/006

See application file for complete search history.

(56) References Cited

U.S. PATENT DOCUMENTS

| | | | | |
|---|---|---|---|---|
| 6,076,937 A | 6/2000 | Wood et al. | | |
| 6,379,023 B1 * | 4/2002 | Passno | F21S 9/04 | 362/486 |

(Continued)

FOREIGN PATENT DOCUMENTS

| | | | |
|---|---|---|---|
| CN | 108972479 A | 12/2018 | |
| CN | 209256874 U | 8/2019 | |

(Continued)

OTHER PUBLICATIONS

Notification of Transmittal of the International Search Report and The Written Opinion of the International Searching Authority, or the Declaration, for PCT/US2025/020276, dated Jul. 7, 2025, 11 pages.

(Continued)

*Primary Examiner* — Alexander K Garlen

(74) *Attorney, Agent, or Firm* — Klintworth & Rozenblat LLP

(57) ABSTRACT

An aerial basket tool apron is mounted within an interior of a bucket of a work truck. The aerial basket tool apron is formed of a body having a front surface and an opposite rear surface, a plurality of pockets extending from the front surface, an electrical component on a surface of the body and circuitry integrated into the body. The electrical component is electrically coupled to the circuitry. Each pocket forming an open-ended cavity which is configured to receive a tool or hardware therein. The electrical component can be, for example, a lighting component or a battery adapter component. A voltage detection circuit, which is configured to detect an electric field, may also be integrated into the body, and an indicator coupled thereto to provide a warning to a utility worker circuitry.

25 Claims, 6 Drawing Sheets

(51) Int. Cl.

| | |
|---|---|
| ***B25H 5/00*** | (2006.01) |
| ***B60R 11/06*** | (2006.01) |
| ***B66F 17/00*** | (2006.01) |
| ***G08B 21/02*** | (2006.01) |

(56) References Cited

U.S. PATENT DOCUMENTS

| | | | | |
|---|---|---|---|---|
| 9,976,715 | B2 * | 5/2018 | Walker | B66F 11/046 |
| 10,338,107 | B1 * | 7/2019 | Beck | B66F 17/006 |
| 10,822,216 | B2 | 11/2020 | Mckinney et al. | |
| 11,054,120 | B1 | 7/2021 | Gable et al. | |
| 11,224,965 | B2 | 1/2022 | Blake | |
| 11,822,356 | B1 * | 11/2023 | Beck | B66C 13/56 |
| 2014/0151420 | A1 * | 6/2014 | Reeves | B66F 13/00 224/401 |
| 2017/0211765 | A1 * | 7/2017 | Walker | B66F 11/04 |
| 2018/0238507 | A1 * | 8/2018 | Walker | F21S 4/26 |
| 2022/0089421 | A1 * | 3/2022 | Hargis | F16B 5/0635 |
| 2023/0100084 | A1 * | 3/2023 | Hargis | B66F 13/00 211/94.01 |

FOREIGN PATENT DOCUMENTS

| | | | |
|---|---|---|---|
| CN | 209699047 | U | 11/2019 |
| JP | 2024-048263 | A | 4/2024 |

OTHER PUBLICATIONS

Milwaukee® Pipeline™: Power Utility Accessories, Hand Tools & Storage https://www.youtube.com/watch?v=ZrzhFp0Pis4, 3:40 / 5:23; Hand Tools Storage Video Uploaded Date Jul. 8, 2021.

Milwaukee Cordless Work Light: M18, Bare Tool, 2,500 Im Max., 3 Modes, 12 1/8 in Max. Ht https://www.grainger.com/product/49JU91?gucid=N:N:PS:Paid:GGL:CSM%202295:4P7A1P:20501231&gad_source=1&gclid=Cj0KCQiAtaOtBhCwARIsAN_x3J4k6zFRRaZi5M1luNcVsa_9aBnLriUN5Bc5ELqbDjMQW4kufhNvpEaAsxrEALw_wcB&gclsrc=a%20.ds.

Klein Tools Utility Bucket Light (Bare Tool) https://www.acmetools.com/klein-tools-utility-bucket-light-bare-tool-bat20ubl/092644290336.html?gad_source=1&gclid=Cj0KCQiAtaOtBhCwARIsAN_x-3Kw8PpVCHo1FSNHc9zTPx30Oud1NZBRw--ogJtXiDWnKnv-olK095kaAkcuEALw_wcB.

Lineman's Aerial Tool Apron, https://www.milwaukeetool.com/Products/48-22-8290, Sep. 23, 2023.

Power Utility Storage_Milwaukee Tool, https://www.milwaukeetool.com/Products/Storage-Solutions/Power-Utility-Storage, Dec. 2, 2019.

Aerial Tool Aprons_Klein Tools, https://www.kleintools.com/catalog/lineman-bucket-bags-accessories/lineman-accessories/aerial-tool-aprons, Sep. 26, 2023.

Tool Storage, Trays & Aprons, https://buckinghammfg.com/product-category/bucket-truck/tool-storage-trays-aprons/, Feb. 28, 2021.

Aerial-Tool-Aprons-Boards, https://www.estexmfg.com/Utilities/Aerial-Tool-Aprons-Boards?PageSize=48&SortExpression=IsFeatured+DESC%2C+OrderBy+ASC%2C+Name+ASC.

Lineman's Aerial Tool Apron_Milwaukee Tool, https://www.milwaukeetool.com/Products/Storage-Solutions/Power-Utility-Storage/48-22-8290, Feb. 25, 2021.

Lineman's Compact Aerial Tool Apron_Milwaukee Tool, https://www.milwaukeetool.com/Products/Storage-Solutions/Power-Utility-Storage/48-22-8291, Oct. 24, 2023.

Small Aerial Apron—51828_Klein Tools, https://www.kleintools.com/catalog/aerial-tool-aprons/small-aerial-apron, Dec. 1, 2022.

Aerial Apron with Hot Stick Pocket and Magnet—51829MHS_Klein Tools https://www.kleintools.com/catalog/aerial-tool-aprons/aerial-apron-hot-stick-pocket-and-magnet, Jun. 25, 2022.

Aerial Apron—51829_Klein Tools, https://www.kleintools.com/catalog/aerial-tool-aprons/aerial-apron, Sep. 30, 2022.

Aerial Apron with Magnet—51829M_Klein Tools https://www.kleintools.com/catalog/aerial-tool-aprons/aerial-apron-magnet, Dec. 8, 2022.

Aerial Basket Tool Apron—4044_4044G9_4044B3—Buckingham, https://buckinghammfg.com/products/aerial-basket-tool-apron-4044-4044g9-4044b3/, Jan. 25, 2021.

9 Pocket Hi-Vis Tool Apron with Hot Stick Holder—45002G9M2P8_45002B3M2P8—Buckingham, https://buckinghammfg.com/products/9-pocket-hi-vis-tool-apron-with-hot-stick-holder-45002g9m2p8-45002b3m2p8/, Aug. 12, 2020.

Aerial Basket Tool Apron—4500YG9/4500Y/4500YB3—Buckingham, https://buckinghammfg.com/products/aerial-basket-tool-apron-4500yg9-4500y-4500yb3/, Sep. 21, 2020.

18 Pocket Tool Apron—4045g9/4045/4045b3—Buckingham, https://buckinghammfg.com/products/18-pocket-tool-apron-4045g9-4045-4045b3/, Sep. 27, 2020.

Illuminated Aerial Apron, 1829-DP-LED https://www.estexmfg.com/Product/Index/2038?CategoryId=15, Apr. 16, 2021.

* cited by examiner

AERIAL BASKET TOOL APRON WITH INTEGRATED POWER SYSTEM

FIELD OF THE DISCLOSURE

The present disclosure generally relates to an aerial basket tool apron having an integrated power system for an interior of a bucket of a work truck, commonly called a bucket truck or an aerial truck.

BACKGROUND

Bucket trucks are used to reach high locations so that a utility worker can access overhead electric power lines and electric power components to perform tasks, such as installation, repair, and/or maintenance. A bucket truck generally includes a boom assembly with an insulated bucket connected to a distal end of the boom assembly. One or more utility workers stand within the bucket to complete the tasks. Tools and hardware are also stored in the bucket, and may be stored in an aerial basket tool apron, to be used during the completion of the task. The buckets are usually small so it is desirable to use storage space as effectively as possible, such as the vertical walls where a tool apron can be utilized.

Work is often performed at night, so proper lighting is critical for completion of the tasks. Prior art methods of providing illumination include lights mounted on the utility worker's helmet, handheld flashlights which may be stored in the aerial basket tool apron, lights clamped to the side of the bucket and/or spotlights from the ground. Helmet lights provide a limited amount of light and require the utility worker to orient his or her head in order to direct the light into the bucket. Lights clamped to the side of the bucket are additional components which may obstruct access over the top edge of the bucket. Spotlights from the ground do not provide illumination into the bucket.

Additionally, utility workers utilizing the bucket truck may be working nearby live high voltage power lines. Bucket truck aprons today may not include voltage detection. Reliably detecting high voltage on distribution and transmission voltage power lines is critical to the jobs performed by electric utility linemen, and these jobs are performed more quickly and safely when the voltage detection is convenient and easy to use.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
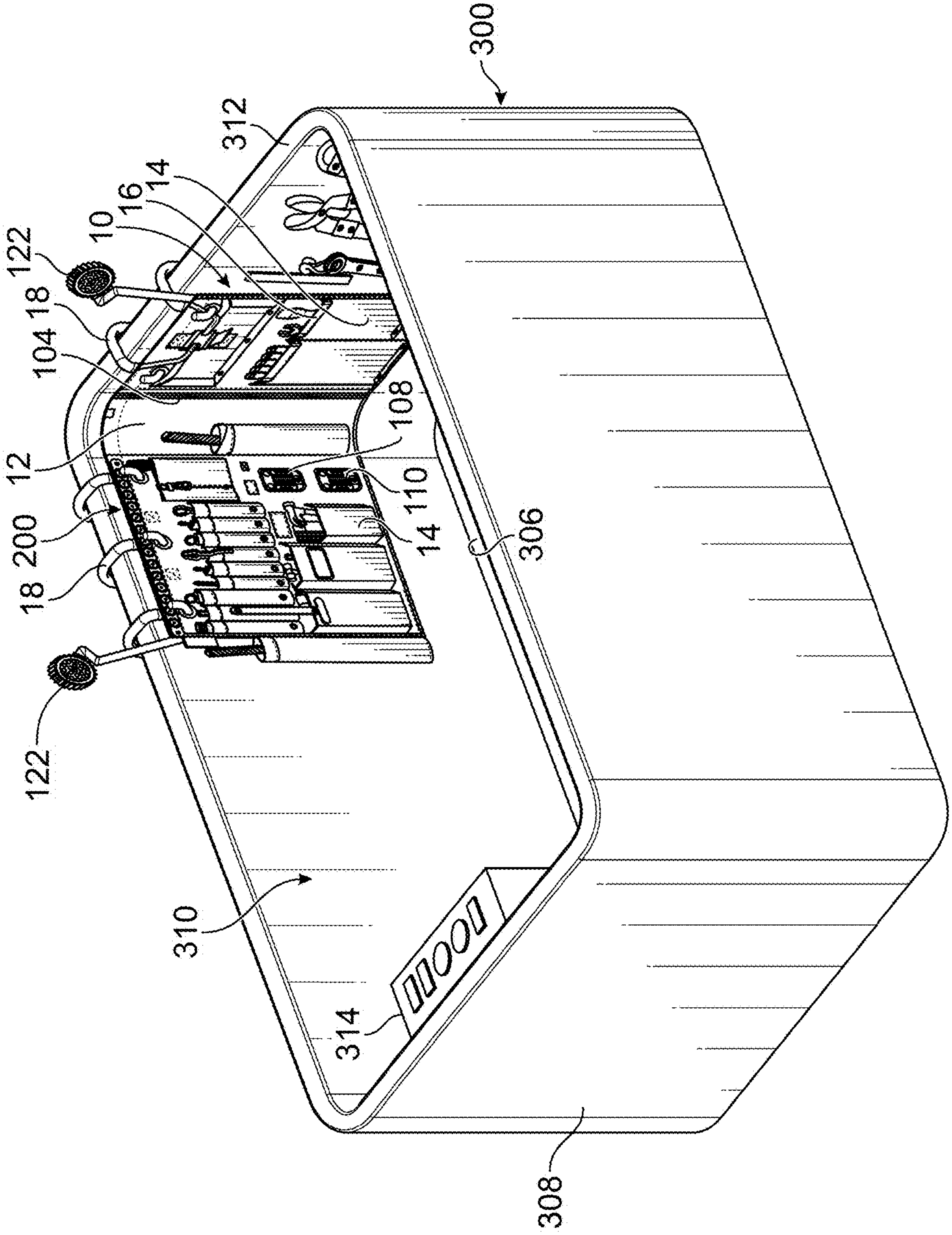
FIG. 1 is a perspective view of an aerial basket tool apron of the present disclosure mounted within a bucket of a work truck.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

An aerial basket tool apron 10 is mounted to an insulated bucket 300 provided on a distal end of boom assembly 302 for a work truck 304, commonly called a bucket truck. The aerial basket tool apron 10 provides the utility worker with the ability to store tools and hardware (herein "parts") within the bucket 300, has an integrated power system 100 within the bucket 300. The integrated power system 100 may include a voltage detector assembly 200. The integrated power system may include lighting which is integrated into the aerial basket tool apron 10 to provide illumination within the bucket 300. Since the lighting is integrated into the aerial basket tool apron 10, separate lights and additional batteries are not needed.

The aerial basket tool apron 10 includes a body 12 having a front surface **12*a* and an opposite rear surface 12*b*, and a plurality of pockets 14 extending from the front surface 12*a*. The body 12 is further defined by a top edge 12*c*, an opposite bottom edge 12*d*, and opposite side edges 12*e*, 12*f* extending therebetween. Each pocket 14 is formed by a section of material bonded at its edges to the body 12 such that the material and the portion of the body 12 thereunder form an open-ended cavity 16. The cavity 16 may open to the top, to one or more of the sides, or to a combination of these. The pockets 14 may have zippers, flaps, clasps, magnets, fasteners, and the like, to completely, or partially, close the cavity 16. The pockets 14 may a lock thereon to close the cavity 16 and prevent easy access to the parts within the pocket 14. Some of all of the pockets 14 may have a phosphorescent backing. The pockets 14 may be made of a transparent material or may have windows to allow a utility worker a view of the parts within the pocket 14. In an embodiment, the body 12 and the pockets 14 are formed of a flexible insulative material, such as heavy vinyl. The body 12 may be formed of layers of material, such as vinyl coated nylon and heavy canvas, which are sewn or otherwise bonded together, which allow for the body 12 to flex, but provide rigidity to the aerial basket tool apron 10. As shown, the body 12 is generally rectangular, but the body 12 may take a variety of shapes. The pockets 14 may be a variety of sizes, and the parts can be stored within the cavities 16 thereof. Other means, such as hooks, loops, hook and loop fasteners, a magnetic board, and the like, for attaching items to the front surface 12*a* can also be provided. The aerial basket tool apron 10 and pockets 14 may also be formed of a rigid insulative material, such as plastic or wood (these types are commonly called tool boards). The aerial basket tool apron 10 may be formed of a rigid insulative material, such as plastic or wood, and the pockets 14 formed of a flexible insulative material. The aerial basket tool apron 10 further includes an attachment 18, shown as hooks, which seat within grommets 20 for releasably attaching the aerial basket tool apron 10 to the bucket 300. Other attachments may be provided for releasably attaching the aerial basket tool apron 10 to the bucket 300. Alternatively, the hooks 18 can be permanently attached to the flexible body 12, or integrally formed with the rigid body 12**.

Figure 5:
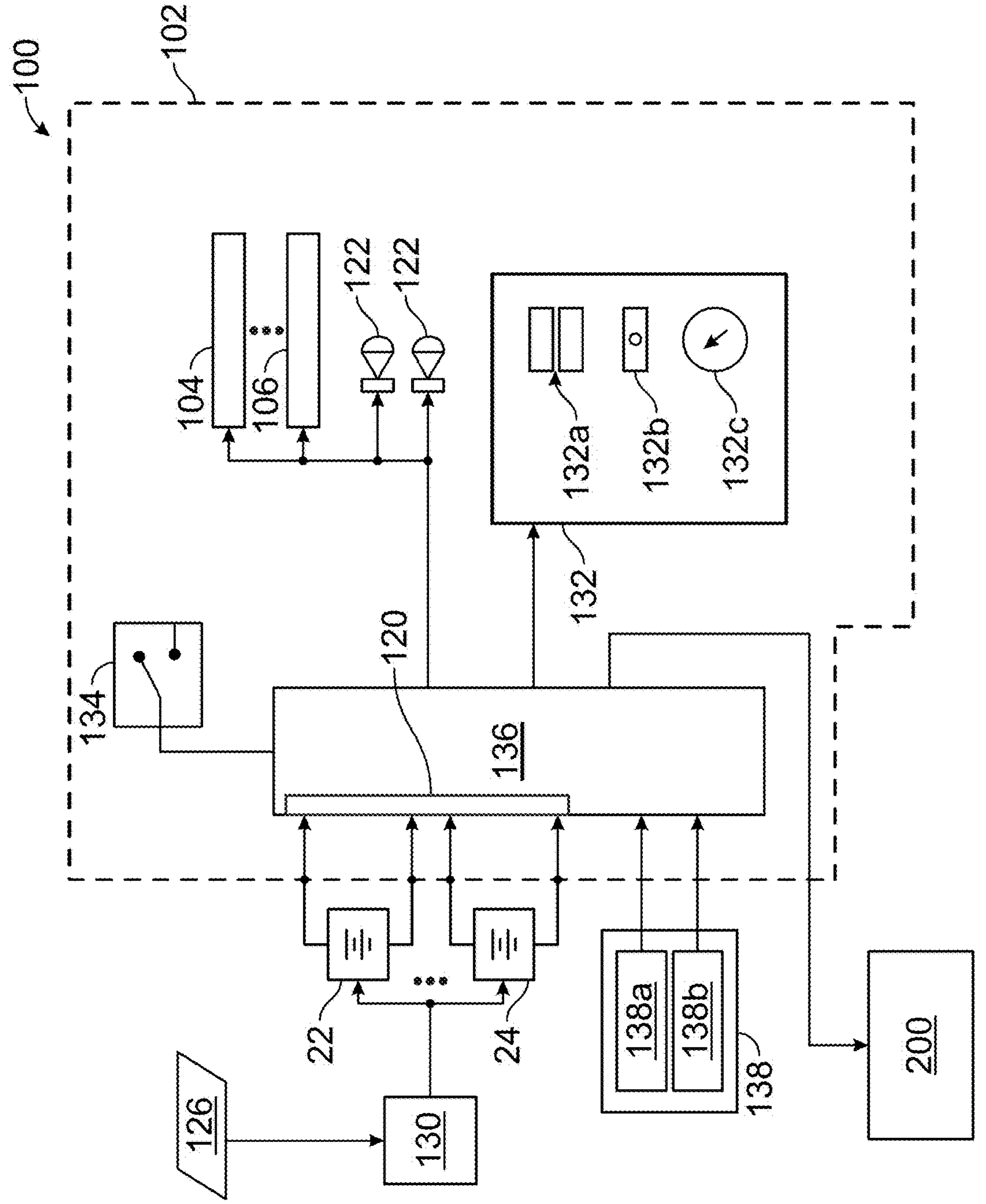
FIG. 5 is a block diagram/schematic representation of electrical circuitry.

The power system 100 is integrated into the body 12 and includes circuitry 102, as described in greater detail in FIG. 5, and at least one electrical component, for example electrical components 104, 106, 108, 114, 122, 126, 132 as described herein, which are attached to the body 12 and are electrically coupled to the circuitry 102. The circuitry 102 may be provided between the layers of the flexible body 12 or imbedded within or attached to the rigid body 12. The circuitry 102 may be covered by covers that can be lifted so that the circuitry 102 can be serviced. The circuitry 102 may include a flexible or hard circuit board. In an embodiment, the electrical components 104, 106, 108, 114, 122, 126, 132 are permanently mounted to the body 12 and to the circuitry 102. In an embodiment, the electrical components 104, 106, 108, 114, 122, 126, 132 are removably attached to the body 12 and to the circuitry 102.

Figure 2:
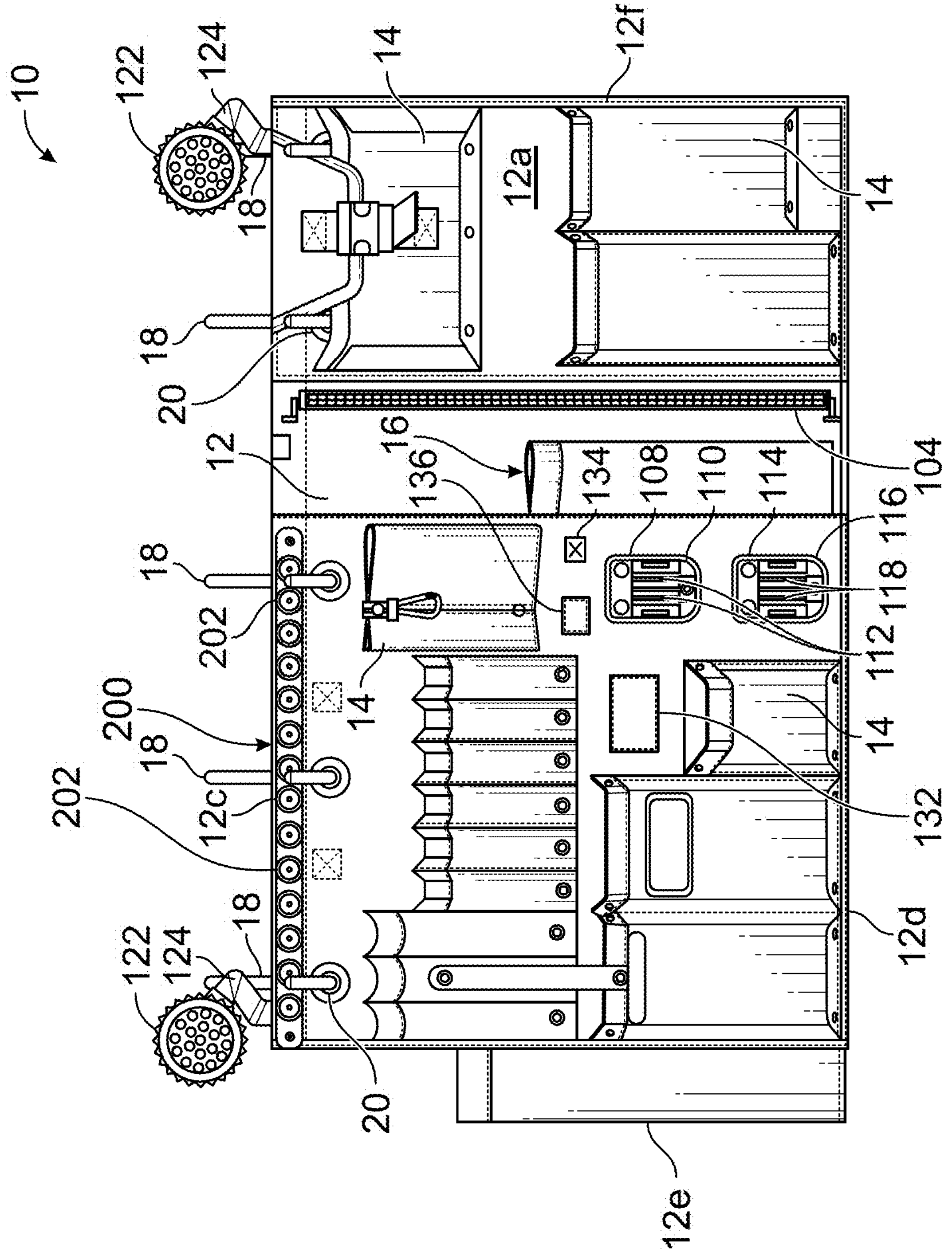
FIG. 2 is a front plan view of the aerial basket tool apron in a laid flat condition.
Figure 3:
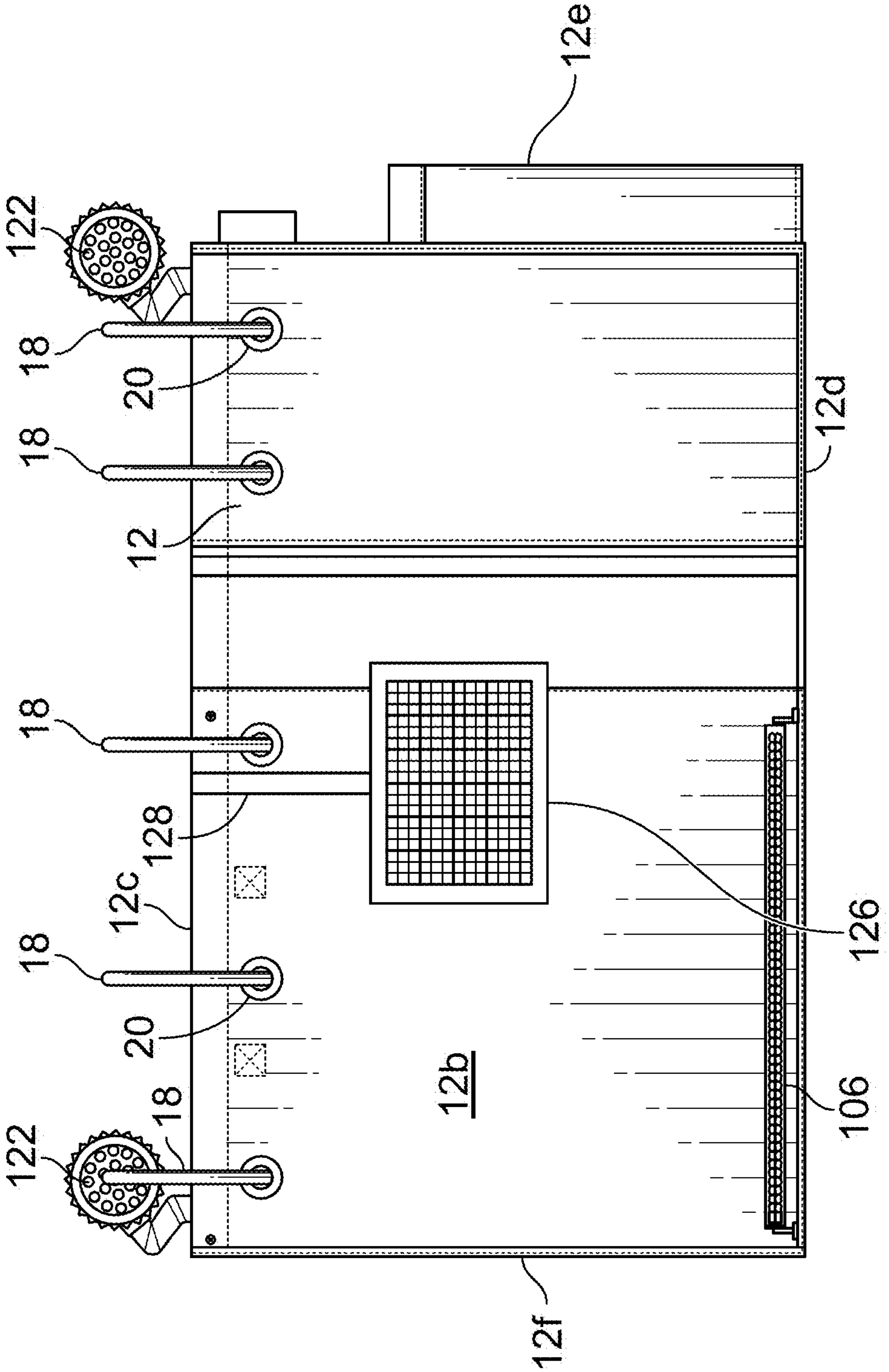
FIG. 3 is a rear plan view of the aerial basket tool apron in the laid flat condition.

The electrical components of the power system 100 may include one or more lighting components 104, 106 on the body 12, and which are powered by the circuitry 102. Lighting components 104, 106 may be provided as one or more LED light strips, fiber optics, light tubes, light pipes, or other illumination technologies, which may be flexible or rigid. An example of such a LED light strip is commercially available from Grainer under the tradename MAXXIMA Strip Lighting, and one such representative light strip is shown in FIGS. 2 and 5. Lighting component 104 is shown as being provided on the front surface 12*a* of the body 12, and preferably does not overlap the pockets 14. In the embodiment as shown, the lighting component 104 is vertical, is provided generally in a center area of the body 12, and extends generally between the top and bottom edges 12*c*, 12*d* of the body 12. The lighting component 104 may be arranged in a horizontal orientation. The illumination from the lighting component 104 is directed outward from the front surface 12*a* of the body 12. The position of the lighting component 104 is not limited to the position shown in FIG. 2. More than one lighting component 104 can be provided on the front surface 12*a* of the body 12. Lighting component 106 is shown as being provided on the rear surface 12*b* of the body 12, but may be provided on the front surface 12*a* of the body 12. In the embodiment as shown, the lighting component 106 is horizontal and may be disposed proximate to the bottom edge 12*d*, and extends generally from one of the side edges 12*f* of the body 12. The illumination from the lighting component 106 is directed downward from the body 12. The position of the lighting component 106 is not limited to the position shown in FIG. 3. Each provided lighting component 104, 106 may be fixed in position on the body 12, or may be mounted by a mount so as to be pivotable on the body 12. If pivotable, a flexible LED light strip may have a hard backing on which the light strip is mounted. The lighting component 104, 106 can be designed to be removable for replacement with a new lighting component, as necessary.

The electrical components of the power system 100 may include a first battery adapter component 108 which is preferably provided on the front surface 12*a* of the body 12. The first battery adapter component 108 has a cradle 110, which may be formed of plastic, having conductive contact pads 112 built therein which connect to the circuitry 102. A first rechargeable battery 22 can be seated within the cradle 110, and removed therefrom. When the first battery 22 is placed into the cradle 110, contact pads on the first battery 22 contact and electrically couple to the contact pads 112 and can provide power to the circuitry 102 as described herein.

The electrical components of the power system 100 may include a second battery adapter component 114 which is preferably provided on the front surface 12*a* of the body 12. As shown, the second battery adapter component 114 is below the first battery adapter component 108. The second battery adapter component 114 has a cradle 116, which may be formed of plastic, having conductive contact pads 118 built therein which connect to the circuitry 102. A second rechargeable battery 24 can be seated within the cradle 116, and removed therefrom. When the second battery 24 is placed into the cradle 116, contact pads on the second battery 24 contact and electrically couple to the contact pads 118 and can provide power to the circuitry 102 as described herein.

Each battery adapter component 108, 114 can be designed to be removable from the body 12, such that the utility worker can take the battery adapter component 108, 114 with them when the job at hand is completed. If removable, a quick mount feature is provided on the body 12 which allows the utility worker to easily attach the battery adapter component 108, 114 to the body 12 and to the circuitry 102 for use.

In an embodiment, one of the batteries 22, 24 provides power to the circuitry 102. The circuitry 102 includes a 3-way switch 120 which allows a utility worker to change between the first battery 22, the second battery 24, and a power off and in some embodiments may be part of with a voltage regulation and distribution circuit 136, discussed herein.

In an embodiment, a battery adapter (not shown) is permanently mounted on the body 12 and is preferably provided on the front surface 12*a* thereof, but does not include contact pads coupled to the circuitry 102. This battery adapter has a cradle which allows the rechargeable battery to be mounted thereon, and removed therefrom, and provides for spare battery storage such that a spare battery is ready for use by the utility worker on tools brought into the bucket 300, or if necessary to replace the first or second batteries 22, 24.

The rechargeable batteries may be 12V, 18V or 20V Ridgid or Makita battery. However, any commercially available suitable battery having a voltage output between 12 volts and 54 volts may be used. The batteries in some embodiments may be lithium-ion batteries.

The electrical components of the power system 100 may include one or more top mounted spotlights 122 which are coupled to the body 12 and extend upward from the top edge 12*c* of the body 12. The one or more spotlights 122 are coupled to the circuitry 102 for power, and may be connected to the body 12 at articulated joints 124, such that the one or more spotlights 122 are rotatable around 360 degrees relative to the body 12 and to each other and/or pivotable relative to the body 12 and to each other. In an embodiment, the one or more spotlights 122 are fixed in position such that the illumination is directed outward from the rear surface 12*b*.

The electrical components of the power system 100 may include one or more solar panels 126 which are mechanically coupled to the body 12 by a flexible coupling 128 and extends from the top edge 12*c* of the body 12. The one or more solar panels 126 hangs down from the top edge 12*c* and the light capturing array faces outward from the rear surface 12*b* of the body 12. The one or more solar panels 126 are electrically coupled to the circuitry 102 to provide power to the circuitry 102 and may in some embodiments, directly power components coupled to the circuitry 102. The one or more solar panels 126 may also be used to charge the batteries 22, 24. A voltage control charging circuit 130 is electrically coupled to the one or more solar panels 126 and provides regulated charging current to the batteries 22, 24.

Referring to FIG. 5, other electrical components 132 of the power system 100 may be provided on the body 12 and powered by the circuitry 102. Such other components 132 include, but are not limited to USB-A or USB-C ports 132*a*, phone chargers 132*b*, battery power indicator 132*c*. A power button 134 can be provided on the body 12 which is coupled to the circuitry 102.

A voltage regulation and distribution circuit 136 forms part of the circuitry 102 and handles routing of DC power from the battery 22 or 24 to provide regulated output power to the various components on in the circuitry 102, and is responsive to the power button 134. This voltage regulation and distribution circuit 136 also regulates the voltage supplied to the various components and accommodates the various range of voltages provided by the battery 22 or 24. The voltage regulation and distribution circuit 136 controls how the battery 22 or 24 supply and distribute regulated power to the various components in the circuitry 102. The charge level of each battery 22, 24 is monitored and when one battery, for example battery 22, is sufficiently depleted, power output to the components of the circuitry 102 is switched to the other battery, for example battery 24, to handle the load.

The powered components of the aerial basket tool apron 10 can be powered off during the daytime or when the lights 104, 106 (and one or more spotlights 122 if provided) are otherwise not needed. Other power saving components 138 may be provided on the body 12 and are coupled to the circuitry 102, such as a daylight sensor 138*a* to automatically turn off the powered components of the aerial basket tool apron 10 when daylight is detected, and/or a timer 138*b* which turns off the powered components of the aerial basket tool apron 10 after a fixed amount of time.

The insulated bucket 300 provides an elevated surface from which at the utility worker can perform tasks. As shown in FIG. 1, the bucket 300 includes a floor 306 with a sidewall 308 extending upwardly therefrom which forms a cavity 310 in which the utility worker(s) stands. The sidewall 308 has a lip 312 at its top edge which extends perpendicular to the sidewall 308. The lip 312 has a width and may be curved. The lip 312 may be continuous around the sidewall 308. The floor 306 and the sidewall 308 are formed of an insulative material to provide electrical isolation from the electrical components being serviced. The sidewall 308 can take a variety of shapes, and may, in the horizontal cross-section, form a square, a rectangle, a circle, or any irregular shape. A set of boom assembly controls 314 can be integrated into the bucket 300 to allow the utility worker to manipulate the boom assembly 302. The bucket 300 may include a door (not shown) in the sidewall 308 to allow for ingress and egress of the utility worker. The dimensions of the bucket 300 may vary; for example, the bucket 300 may have a horizontal cross-section of approximately 720 inches square. The sidewall 308 may have a height of approximately 42 inches.

The hooks 18 of the aerial basket tool apron 10 sit over the lip 312 of the bucket 300 and the body 12 hangs down along the interior of the sidewall 308 and into the cavity 310 of the bucket 300. If a flexible body 12 is provided, the body 12 can bend around projections on the interior surface of the sidewall 308 or can be bent around a corner in the sidewall 308. A rigid body 12 can be specifically designed for particular shapes of the sidewall 308. If one or more solar panels 126 are provided, the one or more solar panels 126 extend along the exterior of the sidewall 308 so that light from outside of the bucket 300 can be captured. The lighting components 104 illuminates the parts within the pockets 14 and further illuminates the cavity 310 so that the utility worker can easily pick out the necessary parts. The lighting component 106 illuminates the floor 306 of the bucket 300. The one or more top mounted spotlights 122 extend upwardly of the lip 312 of the bucket 300 and can be orientated to illuminate a desired area around or in the bucket 300.

Figure 4:
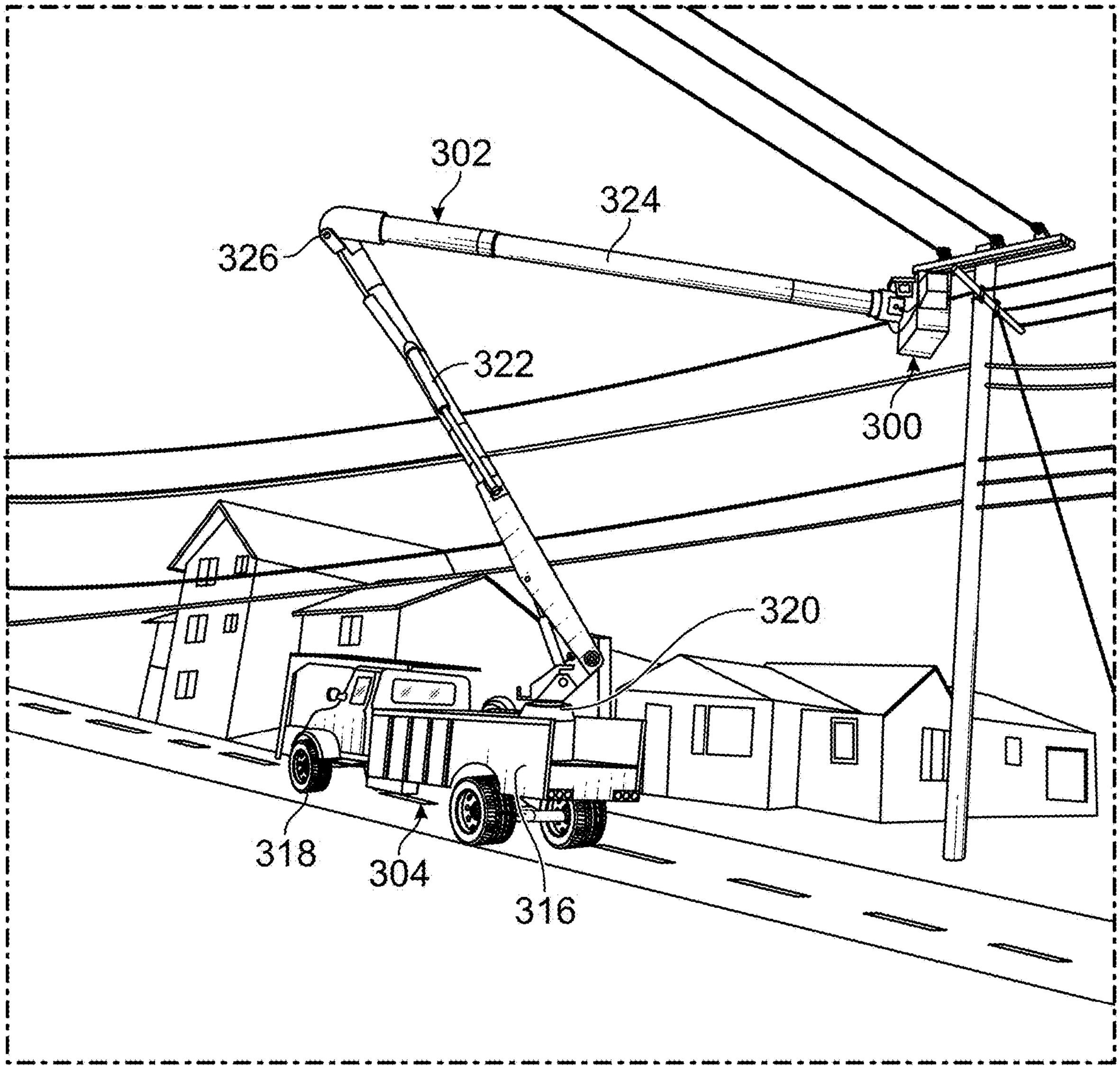
FIG. 4 is a perspective view of the work truck with the bucket.

As shown in FIG. 4, the bucket 300 is mounted on the distal end of the boom assembly 302 of the work truck 304. The work truck 304 includes a vehicle chassis 316, wheels 318, the boom assembly 302 extending from the vehicle chassis 316, the bucket 300 at the distal end of the boom assembly 302, a motor (not shown) for powering the wheels 318, and a motor (not shown) for powering the boom assembly 302. The work truck 304 can be driven to various locations to perform tasks requiring a utility worker to be lifted to the component to be services.

The boom assembly 302 has a proximal end coupled to the vehicle chassis 316 and a distal end at the which the bucket 300 is provided. The proximal end of the boom assembly 302 is rotatably and/or pivotably secured to the vehicle chassis 316 at a mount 320. As shown in the embodiment in the drawings, the boom assembly 302 includes a first boom arm 322 mounted to the vehicle chassis 316 by the mount 320 at its proximal end, and a second boom arm 324 mounted to the distal end of the first boom arm 322. The second boom arm 324 is movable relative to the first boom arm 322 around a pivot coupling 326. Each boom arm 322, 324 may have a plurality of boom sections which can move relative to each other to lengthen/shorten the boom arms 322, 324. The boom sections can telescope relative to each other. Other configurations for the boom assembly 302 are within the scope of the present disclosure.

In an embodiment, the aerial basket tool apron 10 further has an integrated voltage detector assembly 200 which includes a plurality of indicators 202 that are powered by the circuitry 102. The voltage detector assembly 200 is configured to detect an electric field generated by a high-voltage electrical source around the bucket 300. The voltage detector assembly 200 is designed to provide an early warning to the utility worker of the proximity to nearby high-voltage conductors that generate the electric field. In some embodiments, the high-voltage conductors are alternating current (AC) conductors, thus high-voltage AC electric fields are generated. The indicators 202 are on the front surface 12*a* of the body 12 and do not overlap the pockets 14. The voltage detector assembly 200 detects a strength of a detected electric field and/or proximity of the detected electric field. In an embodiment, the indicators 202 provide a visual indication, and are plurality of LEDs.

In the embodiment as shown, the voltage detector assembly 200 may receive battery power from the circuitry 102, as shown in FIG. 5. The voltage detector assembly 200 may be disposed horizontally, and may be located proximate to the top edge 12*c* of the body 12, and extends from one of the side edges 12*e* of the body 12. The illumination from the indicators 202 is directed outward from the front surface 12*a* of the body 12 so as to be easily seen by the utility worker within the bucket 300. The voltage detector assembly 200 is positioned at a distance from the lighting component 104 so that the illumination from the lighting component 104 does not impede the illumination generated by the indicators 202. In an embodiment where voltage detection is provided, the power button 134 does not provide the ability for the utility worker to power off the voltage detector assembly 200 such that the voltage detector assembly 200 is always powered. In another embodiment, a mode button 204 is provided and coupled to the circuitry 102 and allows the utility worker to switch the indicators 202 to an illumination mode only such that the voltage detection is not provided. Further details of the voltage detector assembly 200 is disclosed in United States Published Application No. US 2023-0366919 and/or in U.S. Pat. No. 10,802,065, each of which is incorporated by reference in their entirety, and an embodiment thereof is further described herein with regard to FIGS. 6 and 7.

Figure 6:
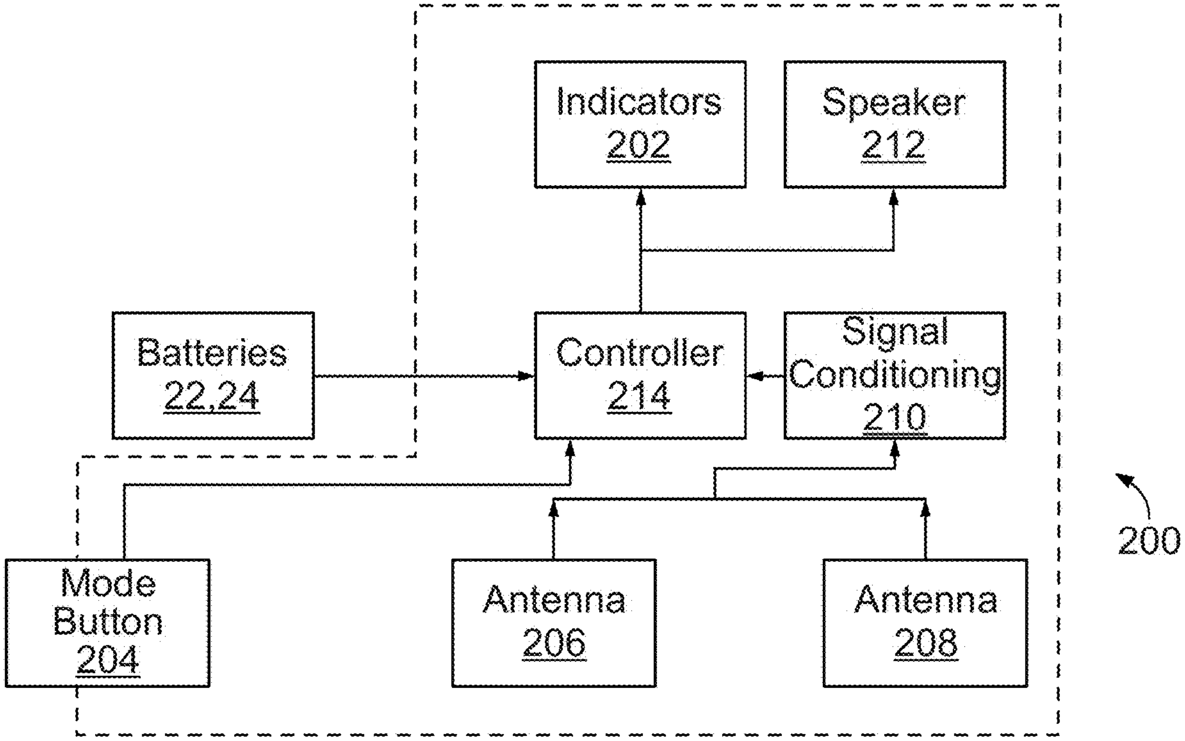
FIG. 6 is a block diagram/schematic representation of an example voltage detector assembly which is provided in the aerial basket tool apron.

FIG. 6 shows an example voltage detector assembly 200 which is contained within the body 12. The body 12 fixedly mounts a printed circuit board (PCB) (not shown), a first antenna 206 and a second antenna 208. The antennas 206, 208 may be mounted to the PCB directly. The antennas 206, 208 may be separated from each other by a predetermined lateral distance or width across the PCB. Instead of first and second antennas 206, 208, a single antenna can be provided.

The battery 22 or 24 provides power to the PCB to power the various electrical components of the voltage detector assembly 200.

Further, the indicators 202 may be operatively coupled to the PCB, which may be configured to provide an alert to the utility worker indicative of a strength of a detected electric field and/or proximity to the bucket 300. In one embodiment, the indicators 202 may include a plurality of LEDs, which are visible to the utility worker. To convey directionality of the electrical field generally relative to the utility worker, the indicators 202 may be illuminated sequentially and periodically to give the illusion of movement of the indicators 202 in a particular direction. This may provide the utility worker with an indication, either leftward of the utility worker, or rightward of the utility worker, of the location of the detected electric field.

Further, FIG. 6 includes a signal conditioning circuit 210 that provides conditioned differential antenna signals to the controller 214. The signal conditioning circuit 210 may include DC offsetting, amplification, lowpass filtering, wave rectification, DC smoothing, overvoltage protection, etc. The signal conditioning circuit 210 turns the raw voltage waveform (sinusoidal+potential noise) picked up by the antennas 206, 208 into a stable, readable value that satisfies the limits and capabilities of the circuitry 102.

Further, another indicators 202 of the plurality of indicators 202 may include an audio transducer 212 or speaker (see FIG. 6) configured to produce an audio warning tone or series of sounds to the utility worker. The volume, frequency, or repetition rate of the audio output device 212 may provide the utility worker with an indication of the proximity to, and hence a possible danger level of the detected electrical field. Similar to the audio transducer 202, the indicators 202 may also be capable of indicating field strength and proximity in addition to directionality. There may be the same three thresholds for the electric field with corresponding LED blinking rates. In other words, when the measured electric field strength increases, the LEDs blink faster and the sound beeps faster indicating that the voltage detector assembly 200 is in closer proximity to the source of the electric field.

FIG. 6 is an electrical block diagram of the voltage detector assembly 200. As described above, the voltage detector assembly 200. A microprocessor or other general purpose controller 214 provides control and operation of the voltage detector assembly 200, including input/output functions for the indicators 202, audio indicator 212 and the like.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. An aerial basket tool apron which is mounted within an interior of a bucket of a work truck, the aerial basket tool apron comprising:

- a body formed of a flexible material having a front surface and an opposite rear surface, the body capable of flexing to conform to a shape of the bucket;
- a plurality of pockets extending from the front surface, each pocket forming an open-ended cavity which is configured to receive a tool or hardware therein;
- an electrical component on a surface of the body; and
- circuitry integrated into the body, the electrical component being electrically coupled to the circuitry.

2. The aerial basket tool apron of claim 1, wherein the circuitry is configured to receive power from the electrical component.

3. The aerial basket tool apron of claim 1, wherein the circuitry is configured to control the electrical component.

4. The aerial basket tool apron of claim 1, wherein the electrical component is permanently mounted on the body.

5. The aerial basket tool apron of claim 1, wherein the electrical component can be removed from the body and replaced with a like electrical component.

6. The aerial basket tool apron of claim 1, wherein the electrical component is a lighting component.

7. The aerial basket tool apron of claim 6, wherein the lighting component directs light away from the front surface of the body.

8. The aerial basket tool apron of claim 6, wherein the lighting component is mounted on the front surface of the body.

9. The aerial basket tool apron of claim 6, further comprising a second electrical component on the body, and the second electrical component being electrically coupled to the circuitry, wherein the second electrical component is a lighting component which directs light toward a bottom edge of the body.

10. The aerial basket tool apron of claim 9, wherein the lighting component which directs light toward a bottom edge of the body is mounted on the rear surface of the body.

11. The aerial basket tool apron of claim 6, further comprising a second electrical component on the body, the second electrical component being electrically coupled to the circuitry, and wherein the second electrical component is a battery adapter component coupled to the body and configured to receive a battery thereon, the battery being removable from the battery adapter component.

12. The aerial basket tool apron of claim 11, wherein the battery adapter component is a first battery adapter component, and further comprising a third electrical component on the body, the third electrical component being electrically coupled to the circuitry, and wherein the third electrical component is a second battery adapter component coupled to the body and configured to receive a separate battery thereon, the separate battery being removable from the second battery adapter component.

13. The aerial basket tool apron of claim 12, wherein the circuitry is powered by one of the batteries mounted to the first or second battery adapter components, and the circuitry further includes a switch configured to be activated to select which battery provides power.

14. The aerial basket tool apron of claim 11, further comprising a rechargeable battery which is mountable on the battery adapter component.

15. The aerial basket tool apron of claim 1, wherein the electrical component is a battery adapter component coupled to the body and configured to receive a battery thereon, the battery being removable from the first battery adapter component.

16. The aerial basket tool apron of claim 15, further comprising a second electrical component on the body, the second electrical component being electrically coupled to the circuitry, and wherein the second electrical component is a second battery adapter component coupled to the body and configured to receive a separate battery thereon, the separate battery being removable from the second battery adapter component.

17. The aerial basket tool apron of claim 16, wherein the circuitry is powered by one of the batteries mounted to the first or second battery adapter components, and the circuitry further includes a switch configured to be activated to select which battery provides power.

18. The aerial basket tool apron of claim 15, further comprising a rechargeable battery which is mountable on the battery adapter.

19. The aerial basket tool apron of claim 1, wherein the body and the pockets are formed of a flexible insulative material, or formed of a rigid insulative material, or the body is formed of a rigid insulative material and the pockets are formed of a flexible insulative material.

20. The aerial basket tool apron of claim 1, further comprising attachments which are used to releasably hang the body on the bucket.

21. The aerial basket tool apron of claim 1, further comprising:

a voltage detection circuit configured to detect an electric field; and at least one indicator coupled to the voltage detection circuit and configured to provide a warning to a utility worker.

22. The aerial basket tool apron of claim 21, wherein the at least one indicator provides a visual warning and/or an audio warning.

23. The aerial basket tool apron of claim 21, wherein the voltage detection circuit is part of the circuitry.

24. An aerial basket tool apron which is mounted within an interior of a bucket of a work truck, the aerial basket tool apron comprising:

a body formed of a flexible material having a front surface and an opposite rear surface, the body capable of flexing to conform to a shape of the bucket;

a plurality of pockets extending from the front surface, each pocket forming an open-ended cavity which is configured to receive a tool or hardware therein;

a voltage detection circuit integrated into the body, the voltage detection circuit configured to detect an electric field; and at least one indicator coupled to the voltage detection circuit and configured to provide a warning to a utility worker circuitry.

25. The aerial basket tool apron of claim 24, wherein the at least one indicator provides a visual warning and/or an audio warning.

* * * * *